United States Patent [19]
Ivett et al.

[11] Patent Number: 5,298,324
[45] Date of Patent: Mar. 29, 1994

[54] MAGNETIC RECORDING MEDIUM HAVING A COBALT-PLANTINUM-CHROMIUM ALLOY MAGNETIC LAYER AND A CHROMIUM-TUNGSTEN UNDERLAYER A SPECIFIED UNDERLAYER THICKNESS RANGE

[75] Inventors: Peter R. Ivett, Totton, England; Kenneth E. Johnson; Richard E. Nelson, both of Rochester, Minn.

[73] Assignee: International Business Machines Corporation, Armonk, N.Y.

[21] Appl. No.: 975,207

[22] Filed: Nov. 10, 1992

Related U.S. Application Data

[63] Continuation of Ser. No. 631,564, Dec. 21, 1990, abandoned.

[51] Int. Cl.$^5$ ................................. G11B 5/00
[52] U.S. Cl. ............................. 428/336; 428/611; 428/667; 428/694 TS; 428/900; 428/928
[58] Field of Search ............... 428/611, 660, 666, 667, 428/694, 900, 928, 336, 694 TS

[56] References Cited
U.S. PATENT DOCUMENTS

| | | | |
|---|---|---|---|
| 4,079,169 | 3/1978 | Nigh et al. | 428/636 |
| 4,652,499 | 3/1987 | Howard | 428/641 |
| 4,654,276 | 3/1987 | Ahlert et al. | 428/641 |
| 4,677,032 | 6/1987 | Robinson | 428/611 |
| 4,749,459 | 6/1988 | Yamashita et al. | 204/192.15 |
| 5,143,794 | 9/1992 | Suzuki et al. | 428/611 |

Primary Examiner—Paul J. Thibodeau
Assistant Examiner—Stevan A. Resan
Attorney, Agent, or Firm—Homer L. Knearl; Francis A. Sirr; Richard E. Billion

[57] ABSTRACT

In a rigid magnetic recording disk, the magnetic properties, such as the coercivity, of a cobalt based, hard, magnetic alloy, such as a cobalt-platinum-chromium (CoPtCr) thin film magnetic recording layer, are controlled by providing a thin, sputtered, underlayer of a nonmagnetic, binary, chromium-tungsten (CrW) alloy whose major constituent is chromium, and preferably of a composition $Cr_{88}W_{12}$ upon which the thin film magnetic recording layer is subsequently sputter deposited.

6 Claims, 3 Drawing Sheets

$\triangle = Co_{75}Pt_8Cr_{17}$
$* = Co_{75}Pt_{12}Cr_{13}$
$2.0 \leq MrT \leq 4.0$
$CrW = Cr_{88}W_{12}$

* = $Cr_{88}W_{12}$ UNDERLAYER
△ = Cr UNDERLAYER
100A ≦ CrW THICKNESS ≦ 200A

MAGNETIC RECORDING MEDIUM HAVING A COBALT-PLANTINUM-CHROMIUM ALLOY MAGNETIC LAYER AND A CHROMIUM-TUNGSTEN UNDERLAYER A SPECIFIED UNDERLAYER THICKNESS RANGE

RELATED APPLICATIONS

This is a continuation of application Ser. No. 07/631,564, filed Dec. 21, 1990, and now abandoned. Copending and commonly assigned U.S. patent application Ser. No. 503,070, filed Mar. 27, 1990, and entitled Thin Film Magnetic Media, (now U.S. Pat. No. 5,063,120) herein by reference.

TECHNICAL FIELD

This invention relates to the field of magnetic recording media, and more specifically to the production of thin film magnetic recording disks for use with disk files or direct access storage devices (DASD).

BACKGROUND OF THE INVENTION

This patent application describes a cobalt alloy thin film magnetic disk having a sputter deposited, single element, chromium underlayer, of a thickness 50 to 200 Angstroms (A), which presents the (100) (one,zero,zero) plane of the chromium atoms at a layer's surface. The cobalt alloy is sputter deposited on this chromium underlayer, such that the (110) plane of the cobalt alloy, and thus the C axis of the cobalt alloy, are parallel to the disk's recording surface, thus facilitating operation of the disk in longitudinal, binary data, recording systems.

The magnetic properties of a thin film magnetic recording layer, for example the coercivity thereof, must be tightly controlled in order for the magnetic recording disk to meet the design specifications of a particular DASD device, which DASD device is in turn used to store digital data in conventional data processing installations.

A goal in the fabrication or manufacture of thin film magnetic recording media is to obtain magnetic properties that are compatible with, and indeed are required by, the read/write transducing head of the DASD unit in which the media will be used.

A number of means have been practiced in the art to control the magnetic properties of thin film magnetic media. Examples are, the use of different materials directly under the thin film magnetic layer, variation in the thickness of the magnetic layer, and the use of different magnetic alloys in the magnetic layer. However, the art has generally not succeeded in controlling the bulk magnetic properties of the thin film magnetic layer for a given set of material and thickness requirements for the magnetic layer.

U.S. Pat. No. 4,749,459, incorporated herein by reference, describes a number of ways by which the coercivity of a thin film magnetic recording layer may be controlled, including forming the magnetic film on a chromium underlayer and controlling the magnetic film's coercivity by controlling the thickness of the underlayer, controlling the amount of platinum in the magnetic film, and sputtering the magnetic film in an atmosphere that includes argon and a trace amount of a selected gas such as nitrogen, ammonia, or oxygen and nitrogen.

U.S. Pat. No. 4,654,276, incorporated herein by reference, is directed to improving the coercivity of a magnetic layer by the use of a nonmagnetic underlayer of tungsten (W) between a substrate and a cobalt-platinum (CoPt) or a cobalt-platinum-chromium (CoPtCr) magnetic layer. This patent also point out that the coercivity of a CoPt magnetic film can be improved by the use of a Cr underlayer, that W has been used as an enhancement layer in certain types of thin film disks, that a layer of an intermetallic compound such as cobalt-tungsten ($Co_3W$) has been used to form a nucleating layer for a subsequently deposited magnetic film, and that a CoPt magnetic layer has been formed on a nonmagnetic layer of a tungsten-cobalt (WCo) alloy.

U.S. Pat. No. 4,079,169, incorporated herein by reference, describes a magnetic recording disk, and recognizes that a clad layer is normally deposited on the substrate member, before a magnetic layer is deposited thereon. This clad layer provides wear resistance and mechanical rigidity, provides an easily polishable layer, protects the underlying aluminum from corrosion, and that this clad layer, as well as any other underlayers, should enhance the coercivity and other magnetic properties of the overlying magnetic thin film layer. The specific cobalt based alloy clad layer that is described comprises 10–30% chromium, from 8–18% tungsten, from 8–30% nickel, the remainder being cobalt. The function of the cobalt and the chromium in this clad layer is to provide corrosion resistance. The function of the tungsten in this clad layer is to provide hardness and rigidity. The function of the nickel in this clad layer is to provide ductility.

The above mentioned related patent application describes a cobalt alloy thin film magnetic disk having a sputter deposited, single element chromium underlayer.

While the various means practiced in the art for controlling the magnetic properties of thin film magnetic recording media have been generally useful, there remains a need in the art for an underlayer of simple construction whereby these magnetic properties can be controlled independent of controlling the magnetic properties of the magnetic layer itself, and independent of factors such as layer thickness.

The present invention provides such an underlayer in the form of a thin, sputtered, underlayer of a nonmagnetic, binary, chromium-tungsten (CrW) alloy whose major constituent is chromium, and preferably of a Cr88%,W12% composition, upon which the thin film magnetic recording layer is subsequently deposited.

SUMMARY OF THE INVENTION

The present invention is directed to magnetic recording media, preferably in the form a thin film, rigid or hard disk of the type that is used in direct access storage devices (DASD). In accordance with the invention, the thin film magnetic recording layer of such a disk is provided with a thin film underlayer consisting of a binary chromium-tungsten (CrW) alloy.

As used herein, the term binary chromium-tungsten alloy (CrW) underlayer is intended to be a limiting term that excludes the use of elements other than Cr and W in the underlayer.

It is known that the atomic alignment of the above mentioned thin film recording layer, as is required to obtain optimum recording properties, is controlled to a major extent by the atomic structure of the above mentioned underlayer. Generally speaking, in DASD devices that utilize horizontal recording, the atoms of the disk's recording layer must be oriented to the surface of the disk, with the easy axis of magnetization parallel to this surface.

In accordance with a feature of the invention, the CrW underlayer of the invention comprises Cr as the major constituent thereof. Since chromium and cobalt atoms are generally of the same physical size, optimum atomic alignment of the subsequently deposited cobalt based recording layer is thus obtained.

It has been found that for equivalent values of MrT (MrT is the product of the remnant magnetic moment and the thickness of a magnetic film), the coercivity of a $Co_{75}Pt_{12}Cr_{13}$ magnetic recording film is about 300 oersteds (Oe) higher when the film is placed upon the binary CrW underlayer of the invention than when the magnetic film is placed upon a conventional Cr underlayer. Thus, an advantage of the invention is to allow a CoPt magnetic film to be formed with less Pt therein, for example 4% less in a CoPtCr alloy, thereby resulting in a cost saving, while producing no reduction in the film's coercivity.

It has also been found that with the use of the binary CrW underlayer of the invention, the coercivity of a cobalt based magnetic recording film does not appreciably change as a function of the thickness of the underlayer. Thus, a further advantage of the invention is to eliminate the effect that this layer thickness manufacturing variable would have on the control of the magnetic film's coercivity.

An object of the present invention is to provide a method for increasing the coercivity of a thin film, cobalt based, magnetic recording layer by providing a thin underlayer of a nonmagnetic, binary, chromium-tungsten (CrW) alloy upon which the thin film magnetic recording layer is subsequently deposited.

A further object of the invention is to provide a method for decreasing the amount of platinum that is needed in a cobalt-platinum (CoPt) based magnetic recording layer, without reducing the coercivity of said recording layer, by providing a thin underlayer of a nonmagnetic, binary, chromium-tungsten (CrW) alloy upon which the thin film magnetic recording layer is subsequently deposited.

A further object of the invention is to provide a thin film, rigid, magnetic recording disk having a rigid, disk shaped, nonferromagnetic substrate member having a binary alloy of chromium and tungsten, the major constituent of which is chromium, sputter coated as a thin film on the substrate member, and having a ferromagnetic cobalt alloy sputter deposited as a thin film on the binary alloy.

These and other objects and advantages of the invention will be apparent to those of skill in the art upon reference to the following detailed description, which description makes reference to the drawing.

DETAILED DESCRIPTION OF THE INVENTION

The present invention provides magnetic recording disk having a CrW underlayer for a magnetic recording thin film, the underlayer being of simple binary element composition. In accordance with the invention, the coercivity of the disk's recording film can be tightly controlled to achieve a target value, as is required by the magnetic read/write heads, and/or the signal processing electronics of a DASD device in which the disk will be used.

While a number of different underlayers have been suggested in the art to control the magnetic properties of thin film magnetic media, prior underlayers are generally sensitive to the thickness of the underlayer, such as in the case of above mentioned U.S. Pat. No. 4,654,276 wherein the coercivity of a magnetic layer is controlled by the use of a nonmagnetic underlayer of tungsten, or the underlayers are of a complex and expensive composition, such as in the case of above mentioned U.S. Pat. No. 4,079,169 wherein a four element chromium-tungsten-nickel-cobalt clad layer is provided.

The present invention provides an underlayer of simple and inexpensive construction whereby the coercivity of a cobalt based thin magnetic film is controlled, independent of the means by which the magnetic properties of the magnetic layer itself are directly controlled, and independent of factors such the thickness of the underlayer. When the cobalt based magnetic film includes platinum, the CrW underlayer of the present invention provides a cost saving in that the coercivity of the magnetic film can be maintained as the quantity of platinum is reduced.

More specifically, the present invention provides such an improved underlayer in the form of a thin, sputtered, underlayer film comprising a nonmagnetic, binary element, chromium-tungsten (CrW) alloy, preferably of a composition range of from about 85 to 99 atomic percent chromium, the remained being tungsten, and most preferably of a Cr(88 atomic percent),W(12 atomic percent) composition, upon which a thin film, cobalt based, magnetic recording layer is subsequently deposited.

While the present invention is not to be limited thereto, it is postulated that the atomic percent of tungsten in the chromium based underlayer should be such as to provide a matching of atomic lattices between the underlayer and the cobalt/platinum based magnetic recording layer. This matching is believed to be facilitated by providing the correct spacings of atoms in both of these layers. Using this hypothesis, such a match is obtained, for example, between a $Cr_{88}W_{12}$ underlayer and a $Co_{75}Pt_{12}Cr_{13}$ magnetic recording layer. Generally, this theory suggests that the greater the atomic percent of platinum in the magnetic recording layer, the greater will be the atomic percent of tungsten in the underlayer, perhaps in a change ratio of about 1 to 1.

Figure 1:
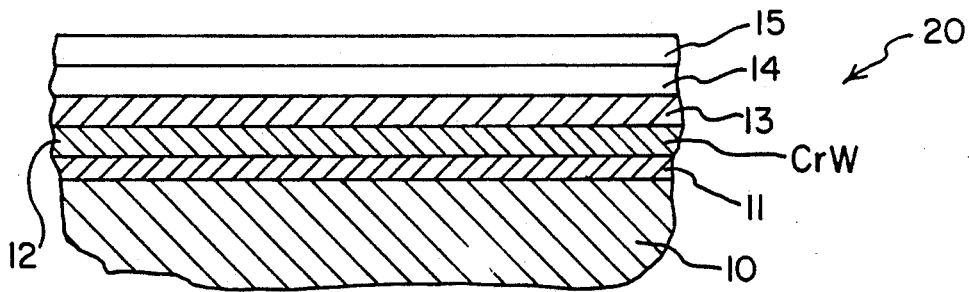
FIG. 1 is a partial section view of a thin film magnetic recording disk having a binary alloy CrW underlayer in accordance with the invention.

FIG. 1 is a partial section view of magnetic recording media in accordance with the invention, and more specifically in the form of a rigid magnetic recording disk 20 of the type generally well known in the art. In this figure reference numeral 10 identifies the media's disk shaped, nonferromagnetic, substrate member. For example, an aluminum disk 10 having an optional layer 11 of a hard, nonmagnetic, material thereon, the exposed surface of layer 11 being polished to be ultra smooth. In accordance with a feature of the invention, layer 11 comprises an electroless plated nickle-phosphorus (NiP) layer.

The CrW binary alloy underlayer of the invention is shown at 12. In accordance with a feature of the invention, the major constituent of binary element underlayer 12 is chromium, and preferably underlayer 12 is of the approximate composition $Cr_{88}W_{12}$. Layer 12 is preferably sputter coated or deposited as a thin film on substrate member 10, or on optional NiP thin film 11 if such a film is provided.

A ferromagnetic, cobalt based alloy, magnetic recording layer 13, for example cobalt-platinum (CoPt) or cobalt-platinum-chromium (CoPtCr), is sputter deposited as a thin film on the exposed surface of thin, binary element, CrW undercoat film 12.

As a feature of the invention, an optional, sputter deposited, protective film 14, for example a carbon based film, may be sputter deposited to overly cobalt based magnetic recording layer 13. Lubricant layer 15 is applied to film 14, to thereby complete the construction of disk 20.

The means by which substrate member 10 is manufactured, and the means by which layers 11-15 are deposited thereon, are well known to those of skill in the art. Thus these means will not be described herein.

A preferred means of depositing CrW binary alloy underlayer 12, cobalt based magnetic recording layer 13, and carbon based protective film 14 is by way of well known sputtering processes.

As stated, the binary composition of CrW underlayer 12 is of a composition range of from about 85 to about 99 atomic percent chromium, the remained being tungsten. Most preferably the binary composition of CrW underlayer 12 is $Cr_{88}W_{12}$.

The criticality in the selection of the composition of binary chromium-tungsten underlayer 11 lies in the fact that since the physical size of cobalt and chromium atoms are similar, and are relatively small as compared to the size of a tungsten atom, the percentage of tungsten in the binary alloy composition should not exceed about 15%. By selecting the chromium-tungsten composition in this manner, the correct atomic orientation of the subsequently deposited atoms of cobalt based magnetic layer 13 will result.

While the manner in which underlayer 12 and recording layer 13 are deposited are not critical to the invention, the following detailed description describes a preferred manner of depositing these two layers.

The thin films are preferably deposited by a DC magnetron vacuum sputter process. Typical base pressures used in the process would be less than $1 \times 2 \times 10^{-6}$ torr, with sputtering pressure being in the range of from about $5 \times 10^{-3}$ torr to about $20 \times 10^{-3}$ torr, and with a sputtering gas flow rate of about 200 sccm. Prior to sputtering, the sputtering chamber is heated to a range of about 100 to about 200 degrees C. The process yields a sputtering rate of about 1000 angstroms per minute.

A typical thickness range for underlayer 12 is from about 100 to about 2000 angstroms, whereas a typical thickness range for recording layer 13 is from about 300 to about 1,000 angstroms.

Figure 2:
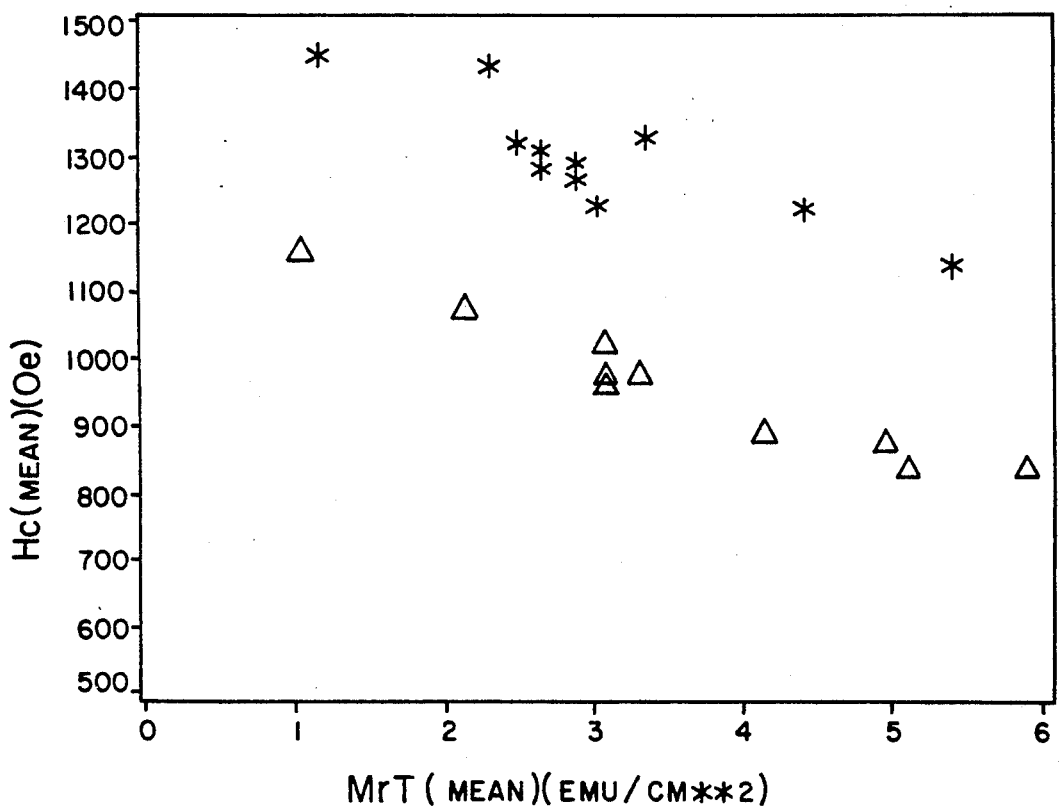
FIG. 2 is a graph showing the mean value of coercivity (Hc) for two $Cr_{75}Pt_{12}Cr_{13}$ magnetic thin films, as a function of a change in the thickness (MrT) of the magnetic film, one magnetic film being provided with a $Cr_{88}W_{12}$ binary underlayer in accordance with the invention, and the other magnetic film being provided with a conventional Cr underlayer, and showing that over a wide range of magnetic film thickness, the coercivity thereof is always higher for the CrW underlayer of the invention.

When the binary alloy CrW underlayer of the invention is provided, it is found that the coercivity of the overlying magnetic recording layer is materially improved, as is shown in FIG. 2.

FIG. 2 plots the mean value of coercivity (Hc) for two $Co_{75}Pt_{12}Cr_{13}$ magnetic thin films 13 as a function of a change in the thickness or MrT characteristic of the magnetic film. One of the two magnetic films is provided with a binary $Cr_{88}W_{12}$ underlayer 12 in accordance with the invention. The other magnetic film 13 is provided with a conventional Cr underlayer.

From FIG. 2 it can be seen that for both magnetic films 13, as the thickness of the magnetic film increases, the coercivity of the film decreases. This is an expected result, and is well known to those of skill in the art.

From FIG. 2 it can also be seen that for a wide range of the thickness of the magnetic layer 13, the coercivity of the magnetic film having the binary alloy CrW underlayer 12 of the invention is in all cases appreciably higher, generally 300 Oe higher, than when the underlayer comprised Cr.

From FIG. 2 it can be stated that the invention has utility for use with magnetic recording layers of a wide range of thickness, from very thin to relatively thick.

As previously stated, not only does the binary CrW alloy underlayer 12 of the present invention provide improved coercivity for the overlying magnetic recording layer 13, but in addition the effect that CrW underlayer 12 has on the magnetic layer's coercivity is independent of the thickness of CrW underlayer 12. Stated in another way, FIG. 3 shows that deposition of the CrW underlayer 12 of the invention does not require accurate process control of the thickness, since the coercivity of overlying magnetic recording layer 13 is not appreciably affected by variations in the thickness of underlayer 12.

Figure 3:
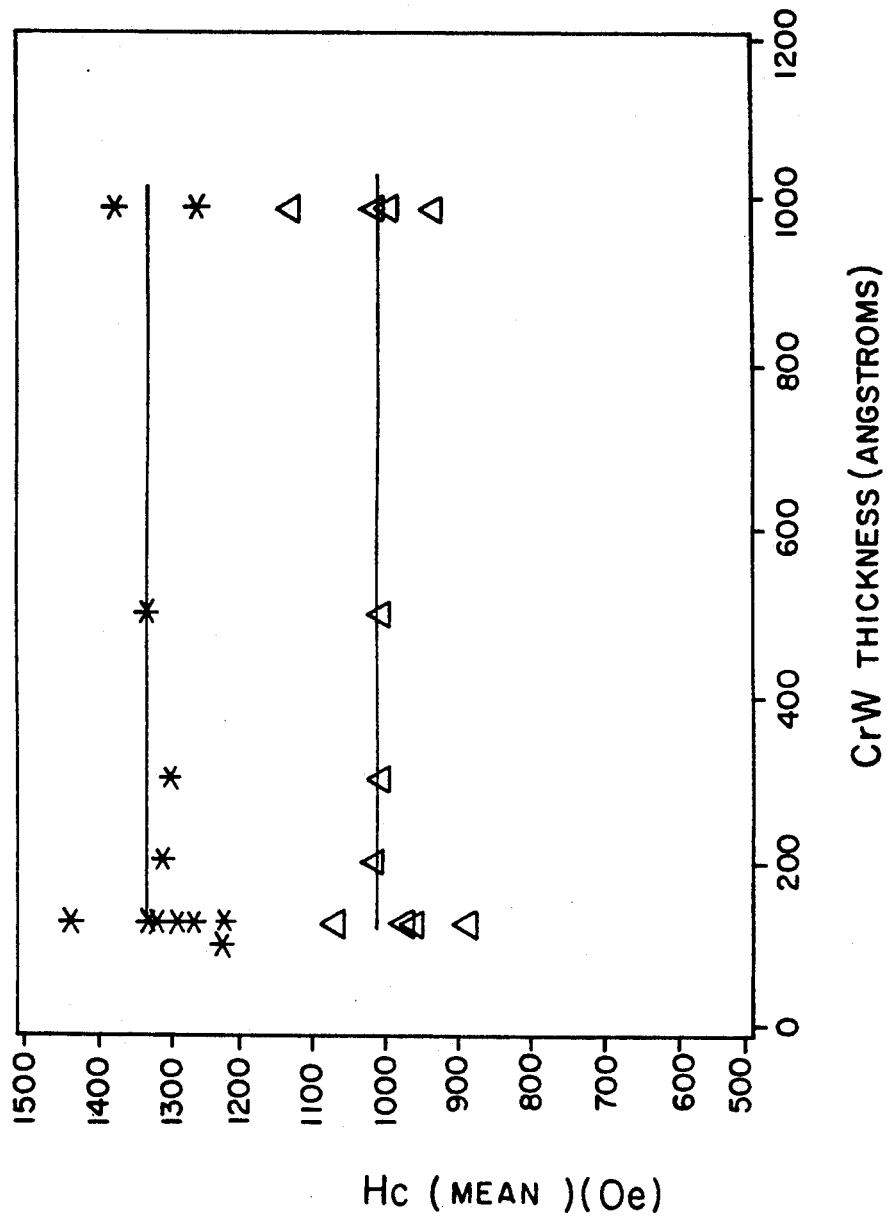
FIG. 3 is a graph showing the mean value of the coercivity (Hc) of two different CoPtCr magnetic thin films, as a function of a change in the thickness of the $Cr_{88}W_{12}$ underlayer of the invention, showing (1) that coercivity of the magnetic films do not change as the thickness of the CrW underlayer increases, and (2) that, as expected, the coercivity of the magnetic film increases as the film's platinum content increases from 8 to 12 percent.

FIG. 3 plots the mean value of the coercivity (Hc) of two CoPtCr magnetic thin films 13 of different PtCr composition, each film having the stated MrT value range, as a function of a change in the thickness of the CrW underlayer 12 of the invention. From FIG. 3 it can be seen that the magnetic film's coercivity does not appreciably change as the thickness of CrW underlayer 12 changes. As a result, improved coercivity control is achieved by operation of the invention because manufacturing variations that may occur in the sputtering of CrW underlayer 12 will have no effect on the coercivity of magnetic film 13.

An advantage of the invention is that with the CrW underlayer 12 of the invention, the coercivity of the magnetic thin film 13 that is deposited on underlayer 12 does not change as a function of the thickness of CrW underlayer 12. As noted, this is demonstrated by FIG. 3.

Figure 4:
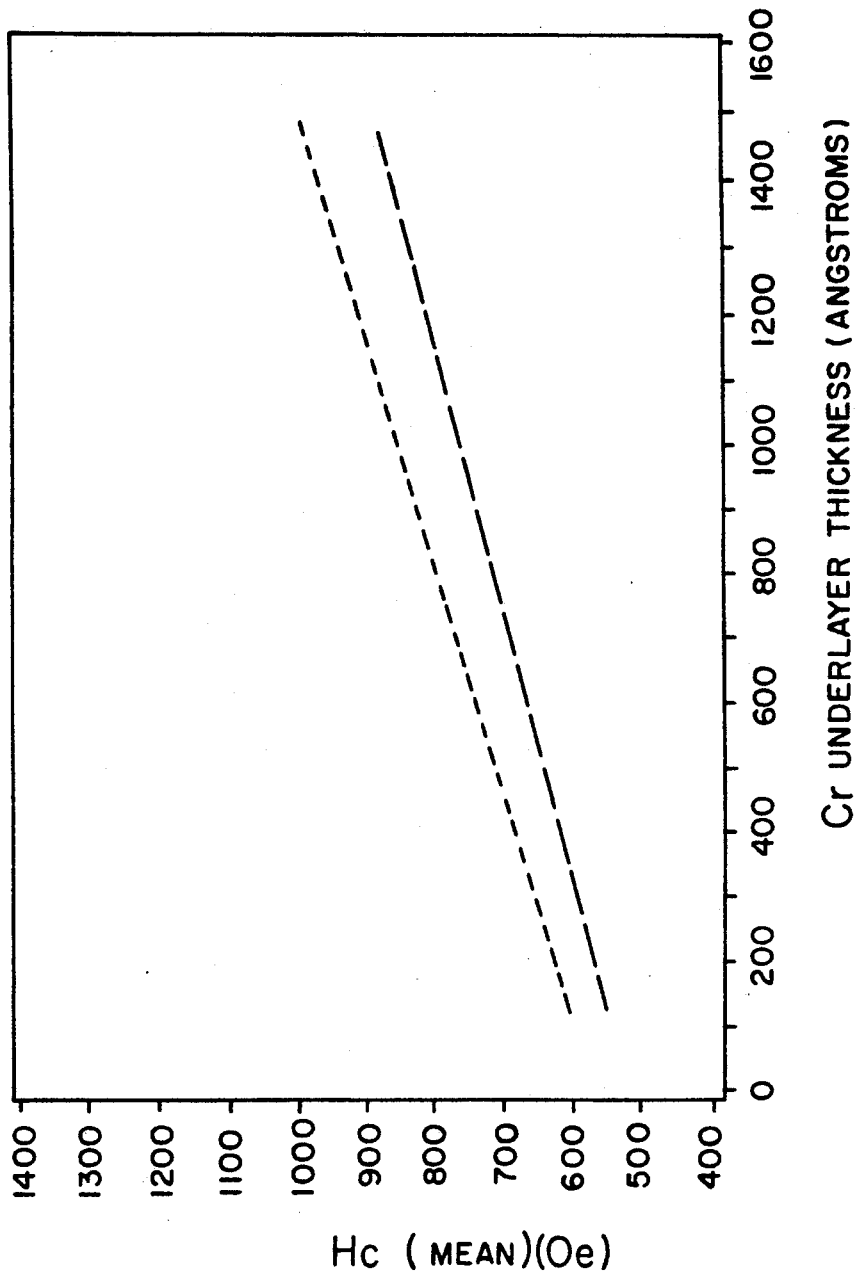
FIG. 4 is a graph showing the mean value of the coercivity (Hc) of two different CoPtCr magnetic thin films as a function of a change in the thickness of a conventional Cr underlayer, showing that contrary to the present invention (as seen in FIG. 3), coercivity of the magnetic films increase as the thickness of the prior art Cr underlayer increases.

The prior art use of a Cr underlayer does not produce this result, as is shown in FIG. 4 wherein it is seen that the coercivity of two CoPtCr magnetic recording films of different PtCr composition varies as a function of the thickness of the underlying Cr layer. As a result, in the prior art the sputtering process whereby the Cr underlayer of FIG. 4 was deposited must be carefully controlled, whereas the thickness of the CrW underlayer 12 of the invention need not be so carefully controlled, as is clearly shown by FIG. 3.

The invention has been described while making reference to embodiments and variations thereof. However, these embodiments and variations are to be considered to be a limitation on the spirit and scope of the invention only insofar as they appear in the claims.

What is claimed is:

1. Magnetic recording medium, comprising;
   a nonmagnetic substrate member, a binary chromium-tungsten alloy, nonmagnetic underlayer formed on said substrate member, said chromium-tungsten underlayer comprising about 12% tungsten by atomic percent, the remainder of said underlayer being chromium,
   said underlayer having a thickness range between 100 Å and 1000 Å, said medium having a coercivity varying less than 20% over the thickness range of said binary chromium-tungsten alloy, and
   a magnetic layer comprising a $Co_{75}PtCr$ alloy formed on said underlayer, said magnetic layer alloy containing platinum in the range of from about 08 to about 12 atomic percent, the remainder being chromium.

2. The magnetic recording medium of claim 1 wherein said underlayer and said magnetic layer ar formed by a sputtering process.

3. The magnetic recording medium of claim 2 wherein said substrate member comprises a rigid member in the shape of a flat disk having oppositely disposed, generally parallel surfaces, each of said parallel surfaces having a said nonmagnetic underlayer and a said thin film magnetic layer thereon.

4. A rigid magnetic recording disk, comprising:
   a rigid, disk shaped, nonferromagnetic substrate member,
   a binary alloy of chromium and tungsten comprising the approximate composition chromium (88 atomic percent) tungsten (12 atomic percent), said binary alloy being deposited as a thin film underlayer directly on said substrate member,
   said binary-alloy underlayer having a thickness range between 100 Å and 1000 Å, said disk having a coercivity varying less than 10% over the thickness range of said binary chromium-tungsten alloy underlayer, and
   a magnetic alloy thin film comprising the approximate composition $Co_{75}Pt_{12}Cr_{13}$ deposited on said binary-alloy underlayer.

5. The magnetic recording disk of claim 4 wherein said substrate member comprises an aluminum disk having a film of NiP thereon.

6. The magnetic recording disk of claim 5 having a carbon based protective film sputter deposited to overlie said magnetic alloy.

* * * * *